(12) United States Patent
Ying et al.

(10) Patent No.: US 12,168,447 B2
(45) Date of Patent: Dec. 17, 2024

(54) METHOD FOR INFORMATION PROCESSING, DEVICE, AND COMPUTER STORAGE MEDIUM

(71) Applicant: Shanghai Qwik Smart Technology Co., Ltd., Shanghai (CN)

(72) Inventors: Zhenkai Ying, Shanghai (CN); Hongren Shi, Shanghai (CN); Ming Yu, Shanghai (CN)

(73) Assignee: Shanghai Qwik Smart Technology Co., Ltd., Shanghai (CN)

( * ) Notice: Subject to any disclaimer, the term of this patent is extended or adjusted under 35 U.S.C. 154(b) by 271 days.

(21) Appl. No.: 17/860,998

(22) Filed: Jul. 8, 2022

(65) Prior Publication Data

US 2022/0363282 A1 Nov. 17, 2022

Related U.S. Application Data

(63) Continuation of application No. PCT/CN2020/141754, filed on Dec. 30, 2020.

(30) Foreign Application Priority Data

Jan. 9, 2020 (CN) .......................... 202010022110.3

(51) Int. Cl.
*B60W 50/08* (2020.01)
*G06F 3/14* (2006.01)
(Continued)

(52) U.S. Cl.
CPC ............... *B60W 50/08* (2013.01); *G06F 3/14* (2013.01); *G10L 17/06* (2013.01); *G10L 17/22* (2013.01); *B60W 2040/089* (2013.01)

(58) Field of Classification Search
CPC ... B60W 50/08; B60W 2040/089; G06F 3/14; G10L 17/06; G10L 17/22
See application file for complete search history.

(56) References Cited

U.S. PATENT DOCUMENTS

| 2017/0094511 | A1* | 3/2017 | Na | H04W 76/11 |
| 2017/0125016 | A1 | 5/2017 | Wang | |
| 2018/0322872 | A1* | 11/2018 | Cha | G10L 15/22 |

FOREIGN PATENT DOCUMENTS

| CN | 107436680 A | 12/2017 |
| CN | 107910007 A | 4/2018 |
| CN | 108847242 A | 11/2018 |

OTHER PUBLICATIONS

First Office Action issued in corresponding CN Application No. CN202010022110.3, mailed Jan. 26, 2022, p. 1-8, Beijing, China.
(Continued)

*Primary Examiner* — Aryan E Weisenfeld
(74) *Attorney, Agent, or Firm* — AP3 Law Firm PLLC

(57) ABSTRACT

A method for information processing, a device, and a computer readable storage medium are provided. The method includes the following. At an in-vehicle electronic device, in response to a determination that a received voice input is associated with switching a source device for switching a rendered content shown at the in-vehicle electronic device, voiceprint information of the voice input is obtained. A user identity corresponding to the voiceprint information is identified. A mapping table between user identities and connected electronic devices or connectable electronic devices is searched for a first electronic device corresponding to the identified user identity. In response to searching out the first electronic device, a first channel for transmission of rendered content between the in-vehicle electronic device and the first electronic device is established, so as to render a first presenting content which is received from the first electronic device through the first channel.

17 Claims, 7 Drawing Sheets

(51) Int. Cl.
    *G10L 17/06*           (2013.01)
    *G10L 17/22*           (2013.01)
    *B60W 40/08*         (2012.01)

(56) References Cited

OTHER PUBLICATIONS

Pencheng, G. et al. "Design and Realization of Vehicle Speech Recognition and Control System", <<Computer Application and Software>>, May 31, 2017 (May 31, 2017).

The second Office Action issued in corresponding CN Application No. CN202010022110.3, mailed Jun. 23, 2022, p. 1-11, Beijing, China.

\* cited by examiner

METHOD FOR INFORMATION PROCESSING, DEVICE, AND COMPUTER STORAGE MEDIUM

CROSS-REFERENCE TO RELATED APPLICATIONS

This application is a continuation of International Application No. PCT/CN2020/141754, filed on Dec. 30, 2020, which claims priority to Chinese Patent Application No. 202010022110.3, filed on Jan. 9, 2020, the disclosures of which are hereby incorporated by reference in their entireties.

TECHNICAL FIELD

Implementations of this disclosure relates to the field of information processing, and in particular to a method for information processing, a device, and a computer storage medium.

BACKGROUND

With the development of the Internet of Vehicles, more and more vehicles are able to be connected with smart phones with aid of communication technologies like wireless fidelity (Wi-Fi), Bluetooth, cellular communication, etc. Some vehicles also allow smart phones to display contents of map applications or video applications on an in-vehicle display, or to play music through an in-vehicle speaker, so it is possible to make better use of the in-vehicle output device for output.

SUMMARY

Implementations of the disclosure provide a method for information processing, a device, and a computer storage medium, to render at a vehicle rendered contents from an electronic device corresponding to a user based on a voice switching instruction and voiceprint information of the user, which is convenient and efficient without complicated manual operations, improving user experience.

According to a first aspect of the disclosure, a method for information processing is provided. The method includes the following. At an in-vehicle electronic device, in response to a determination that a received voice input is associated with switching a source device for switching a rendered content shown at the in-vehicle electronic device, voiceprint information of the voice input is obtained. A user identity corresponding to the voiceprint information is identified. A mapping table between user identities and connected electronic devices or connectable electronic devices is searched for a first electronic device corresponding to the identified user identity. In response to searching out the first electronic device which is the source device, a first channel for transmission of rendered content between the in-vehicle electronic device and the first electronic device is established, so as to render a first presenting content which is received from the first electronic device through the first channel.

According to a second aspect of the disclosure, an electronic device is provided. The electronic device includes at least one processing unit and at least one memory. The at least one memory is coupled with the at least one processing unit and stores instructions configured to be executed by the at least one processing unit. When executed by the at least one processing unit, the instructions cause the electronic device to: obtain, at an in-vehicle electronic device, voiceprint information of a received voice input in response to a determination that the voice input is associated with switching a source device for switching a rendered content shown at the in-vehicle electronic device; identify a user identity corresponding to the voiceprint information; search a mapping table between user identities and connected electronic devices or connectable electronic devices for a first electronic device corresponding to the identified user identity; and establish a first channel for transmission of rendered content between the in-vehicle electronic device and the first electronic device in response to searching out the first electronic device which is the source device, so as to render a first presenting content which is received from the first electronic device through the first channel.

According to a third aspect of the disclosure, a computer-readable storage medium is provided. The computer-readable storage medium stores a computer program. When executed by a machine, the computer program causes the machine to implement any of the operations of the method of the first aspect.

The summary is provided to introduce concepts of the disclosure in a simplified form, which will be further described in the following detailed description. The summary does not intend to identify key features or essential features of the present disclosure, nor does it intend to limit the scope of the present disclosure.

BRIEF DESCRIPTION OF THE DRAWINGS

The foregoing and other objects, features, and advantages of the present disclosure will become more apparent through a more detailed description of exemplary implementations of the present disclosure in conjunction with the accompanying drawings. In the exemplary implementations of the present disclosure, the same reference numerals generally represent the same components.

In various figures, the same or corresponding numerals represent the same or corresponding parts.

DETAILED DESCRIPTION OF ILLUSTRATIVE EMBODIMENTS

Figure 1:
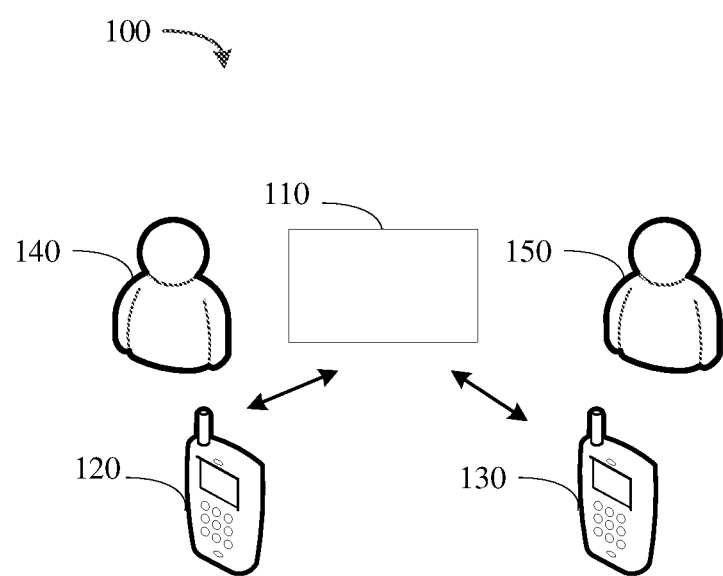
FIG. 1 is a schematic diagram illustrating an exemplified information processing environment 100 according to implementations of the disclosure.

Various implementations of the present disclosure will be described in more details with reference to the drawings. Although the drawings illustrate the implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "include" and its variants are to be read as open-ended terms that mean "include, but is not limited to." The term "or" is to be read as "and/or" unless the context clearly indicates otherwise. The term "based on" is to be read as "at least based on in part." The terms "one example implementation" and "one implementation" are to be read as "at least one example implementation." The term "a further implementation" is to be read as "at least a further implementation." The terms "first", "second" and so on can refer to the same or different objects. The following text also can include other explicit and implicit definitions.

Currently, when multiple electronic devices are connected to an in-vehicle electronic device, if one of the multiple electronic devices needs to output rendered content thereof via the in-vehicle electronic device, it often requires to actively perform operations on the one electronic device, which is tedious. In addition, if it is required to switch to output rendered content of another electronic device, manually operation is also needed, which is not intelligent enough.

To solve at least in part the foregoing problems and one or more of other potential problems, implementations of the disclosure provide a scheme for information processing. In this scheme, at an in-vehicle electronic device, in response to a determination that a received voice input is associated with switching a source device for switching a rendered content shown at the in-vehicle electronic device, voiceprint information of the voice input is obtained. A user identity corresponding to the voiceprint information is identified. A mapping table between user identities and connected electronic devices or connectable electronic devices is searched for a first electronic device corresponding to the identified user identity. In response to searching out the first electronic device which is the source device, a first channel for transmission of rendered content between the in-vehicle electronic device and the first electronic device is established, so as to render a first presenting content which is received from the first electronic device through the first channel.

In this way, the rendered content of the electronic device corresponding to the user can be rendered at the vehicle based on a voice switching instruction and the voiceprint information of the user, which is convenient and efficient without complicated manual operations, and improves user experience.

In the following, specific examples of the schemes will be described in greater detail in conjunction with the figures.

FIG. 1 is a schematic diagram illustrating an exemplified information processing environment 100 according to implementations of the disclosure. In the information processing environment 100, there are an in-vehicle electronic device 110, a first electronic device 120, a second electronic device 130, a first user 140, and a second user 150.

The in-vehicle electronic device 110 may be, but not limited to, an in-vehicle computer, an in-vehicle controller, and so on. The in-vehicle electronic device 110 includes at least a processor and a memory. The memory is configured to store one or more computer programs. The processor is coupled with the memory and is configured to execute the one or more computer programs to cause the in-vehicle electronic device to achieve one or more functions. The in-vehicle electronic device 110 may be coupled with an in-vehicle display, such as a central control screen, for displaying contents like images. The in-vehicle electronic device 110 may be coupled with an in-vehicle speaker to output an audio signal. The in-vehicle electronic device 110 may be coupled with an in-vehicle pick-up, such as a microphone, to obtain a voice input. The in-vehicle electronic device 110 may be coupled with an in-vehicle USB interface to be connected with the first electronic device 120 and/or the second electronic device 130 via the in-vehicle USB interface.

The communication module, such as a telematics BOX (T-BOX), may communicate with the first electronic device 120 and the second electronic device 130. In some implementations, the communication module may include a direct communication module, which is configured to communicate with the first electronic device 120 and the second electronic device 130. For example, the direct communication module may communicate with the first electronic device 120 and the second electronic device 130 via any applicable communication technology, such as Bluetooth, wireless fidelity (Wi-Fi), Zigbee, near field communication (NFC), and cellular communication. For example, the communication module may keep connection with the first electronic device 120 and the second electronic device 130 in a Wi-Fi AP mode, and may also keep connection with the first electronic device 120 and the second electronic device 130 in a Wi-Fi direct mode.

In some implementations, the first electronic device 120 and the second electronic device 130 may have wireless transmitting and receiving capabilities and may have access to the Internet. The first electronic device 120 and the second electronic device 130 may be, for example, but not limited to, a mobile phone, a smart phone, a laptop computer, a tablet computer, a personal digital assistant (PDA), a wearable device, and the like. It should be appreciated that although two electronic devices are shown in FIG. 1, this is merely an example. There may be more or less electronic devices.

In some implementations, the first electronic device 120 and the second electronic device 130 may each include at least a communication module, a memory, and a processor. The communication module is configured to communicate with the in-vehicle electronic device 110. The memory is configured to store one or more computer programs. The processor is coupled with the memory and is configured to execute the one or more computer programs to cause the first electronic device 120 and the second electronic device 130 to achieve one or more functions.

In the following, operations performed by the in-vehicle electronic device 110 will be described in detail in conjunction with FIG. 2.

Figure 2:
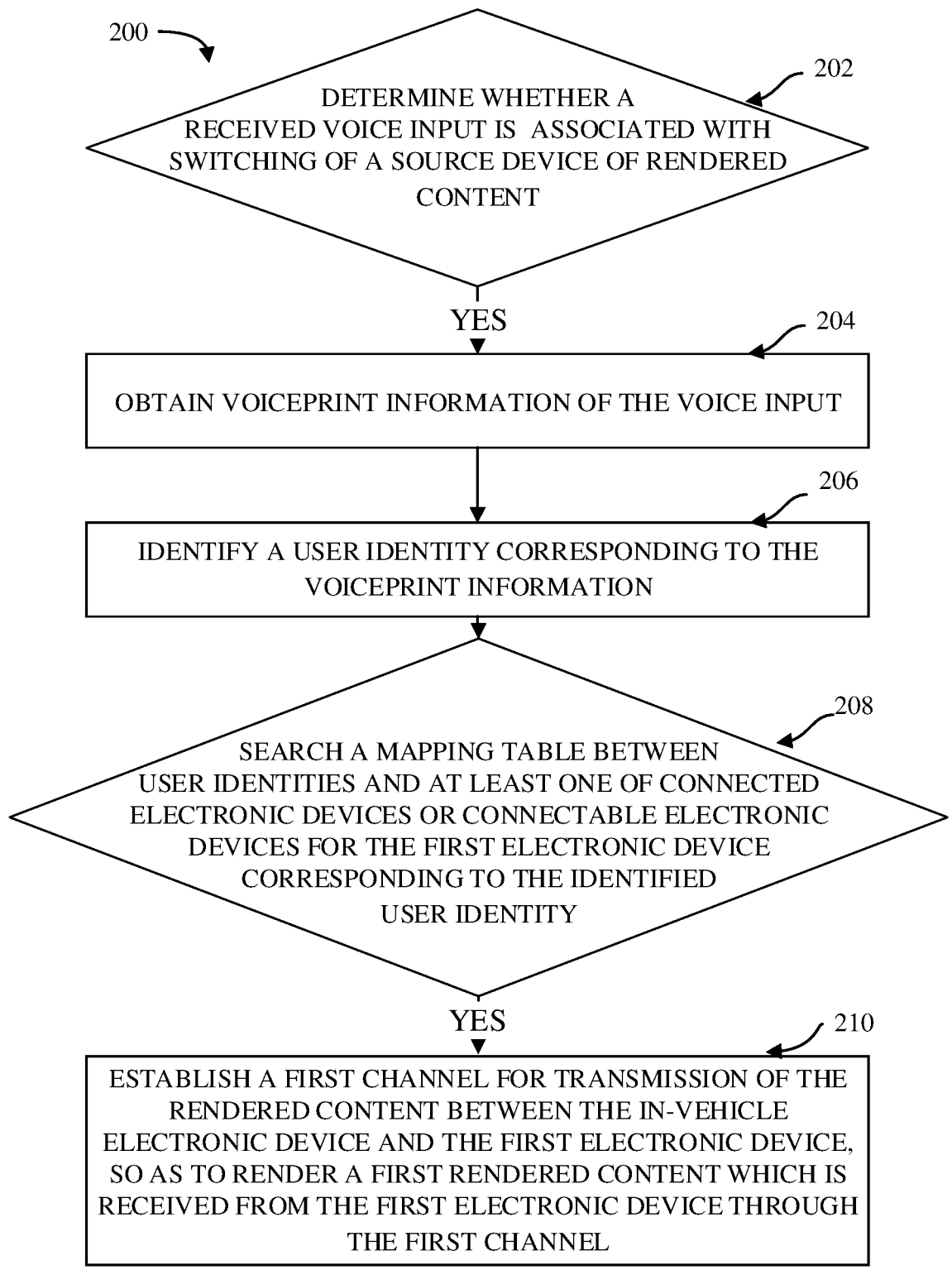
FIG. 2 is a schematic flow chart illustrating a method for information processing according to implementations of the disclosure.

FIG. 2 is a schematic flow chart illustrating a method 200 for information processing according to implementations of the disclosure. For example, the method 200 may be performed by the in-vehicle electronic device 110 as shown in FIG. 1. It should be noted that the method 200 may further include additional blocks not shown and/or may omit blocks shown, and the disclosure is not limited thereto.

At block 202, at the in-vehicle electronic device 110, whether a received voice input is associated with switching a source device for switching a rendered content shown at the in-vehicle electronic device is determined. The voice input may include a predetermined word or phrase which is associated with the switching of the source device of the rendered content. For example, the predetermined word or phrase may include "use my phone", "listen to my songs", "watch my movies", etc. In this case, the source device may be a device of the speaker. For another example, the predetermined word or phrase may include "use my wife's phone", in which case the source device may be a device of the wife of the speaker. For another example, the predetermined word or phrase may include "listen to my father's songs", in which case the source device may be a device of the father of the speaker. Similarly, the source device may be derived from the predetermined word or phrase in the voice input. In particular, two kinds of information may be indicated by the predetermined word or phrase, that is, content information and source information. The content information may be contained in a word such as "movie", "video", or "song", indicating content to be presented. The source information may be included in a word or phrase such as "my", "my father", or "my son" that indicates a personal identity, based on which a source device associated with the personal identity may be determined through subsequent operations (for example, voiceprint recognition). If such a predetermined word or phrase is identified, it is determined that the received voice input is associated with the switching of the source device of the rendered content.

When the received voice input is determined to be associated with switching the source device for switching a rendered content shown at the in-vehicle electronic device at block 202, voiceprint information of the voice input is obtained at block 204. The voiceprint information, e.g., may be obtained by extracting a voiceprint feature from the voice input. The voiceprint feature, e.g., may be extracted using any applicable voiceprint feature extracting method.

At block 206, a user identity corresponding to the voiceprint information is identified.

In some implementations, the user identity corresponding to the voiceprint information may be identified based on a pre-trained voiceprint identification model. For example, the voiceprint identification model may be a deep neural network model.

Alternatively or additionally, in some implementations, the user identity corresponding to the voiceprint information may be identified as follows. The extracted voiceprint feature is compared with pre-stored voiceprint features, and the user identity corresponding to a voiceprint feature which is matched with the extracted voiceprint feature is obtained. For example, the in-vehicle electronic device 110 may pre-store a voiceprint feature and an identity of a first user, and a voiceprint feature and an identity of a second user. If the extracted voiceprint feature is matched with the voiceprint feature of the first user, then the user identity corresponding to the voiceprint feature is determined as the identity of the first user.

At block 208, a mapping table between user identities and connected electronic devices or connectable electronic devices is searched for the first electronic device 120 corresponding to the identified user identity.

For example, the in-vehicle electronic device 110 may maintain the mapping table between the user identities and the connected electronic devices or connectable electronic devices. For example, whenever an electronic device is connected to the in-vehicle electronic device 110 and/or a connectable electronic device such as a Bluetooth electronic device is detected, a mapping between the identity of the electronic device and the user identity corresponding to the electronic device may be added to the mapping table. In one implementation, the mapping table may include a mapping table between connected electronic devices and user identities, such as a mapping table between electronic devices connected to Wi-Fi and their user identities. In another implementation, the mapping table may include a mapping table between connectable electronic devices and user identities, such as a mapping table between connectable Bluetooth electronic devices and their user identities. In yet another implementation, the mapping table may include a mapping table between connected electronic devices and connectable electronic devices and user identities, such as a mapping table between electronic devices connected to Wi-Fi and their user identities and between connectable Bluetooth electronic devices and their user identities. The identity of the electronic device, for example, may include a name, a universally unique identifier (UUID), a device serial number, a subscriber identity module (SIM) card serial number, a media access control (MAC) address, and the like of the electronic device. The user identity, for example, may include a user name. The connection, for example, may include a Wi-Fi connection, a Bluetooth connection, a USB connection, and the like.

For example, if the mapping table includes the first electronic device 120 and the second electronic device 130, and the user identity corresponding to the voiceprint information is identified to be a user name of a first user, then the first electronic device 120 corresponding to the user name of the first user is found out. If the mapping table includes only the second electronic device 130, it is unable to find out the first electronic device 120 corresponding to the user name of the first user.

When the first electronic device 120 corresponding to the user identity is found out at block 208, the source device is identified as the first electronic device, and a first channel for transmission of a first presenting content between the in-vehicle electronic device and the first electronic device is established at block 210, so as to render the first presenting content which is received from the first electronic device through the first channel. As such, the rendered content shown at the in-vehicle electronic device is switched to the first presenting content from the first electronic device.

The first channel, for example, may include a transmission control protocol (TCP) connection channel, a digital living network alliance (DLNA) protocol channel, an Airplay protocol channel, a Miracast protocol channel, and the like. After the first channel is established, the first electronic device 120 may transmit the currently rendered content to the in-vehicle electronic device 110 through the first channel. The rendered content, for example, may include an audio content such as music, and may also include a display content such as an image, a word, a video, and the like.

In some implementations, the first presenting content from the first electronic device 120 is not compressed or encoded, so that the first presenting content may be rendered directly. In other implementations, the first presenting content from the first electronic device 120 is compressed and encoded, such as encoded video, so that the first presenting content needs to be decompressed before rendered.

If the first presenting content includes a display content, the in-vehicle display may display the first presenting content, such as display images, videos, and the like. If the first presenting content includes an audio content, the in-vehicle speaker may play the first presenting content, such as play music and the like.

In this way, rendered contents from the electronic device corresponding to the user may be rendered at the vehicle based on the voice switching instruction and the voiceprint information of the user, which is convenient and efficient without complicated manual operations, improving user experience.

In some implementations, the method 200 may further include the following. At least one of an application name or an application type indicated by the voice input is determined. An instruction for rendering an application corresponding to the application name or the application type is sent to the first electronic device 120, such that the first presenting content includes the corresponding application.

For example, the voice input from the user may be "listen to my songs". It can be determined that the application type indicated by the voice input is a music application. An instruction for rendering the music application may be sent to the first electronic device 120. The first electronic device 120 may subsequently launch a local music application and play an audio content corresponding to the application, and send the audio content played by the application and a possible display content such as an application interface to the in-vehicle electronic device 110. The in-vehicle electronic device 110 may play the received audio content and display the possible display content. A method for determining the application type indicated by the voice input will be described in the following in detail with reference to FIG. 3.

For another example, the voice input from the user may be "display my photo album". An application name indicated by the voice input may be determined. An instruction for rendering an album application is sent to the first electronic device 120. The first electronic device 120 may subsequently launch a local album application and send a display content of the album application, such as a photo, to the in-vehicle electronic device 110. The in-vehicle electronic device 110 may display the received photo.

As such, the application to be rendered may be determined based on the user's voice input and launched at the first electronic device. The rendered content of the application may be rendered at the in-vehicle electronic device without manually launching the application at the first electronic device, which avoids tedious operations and improves user experience.

Figure 3:
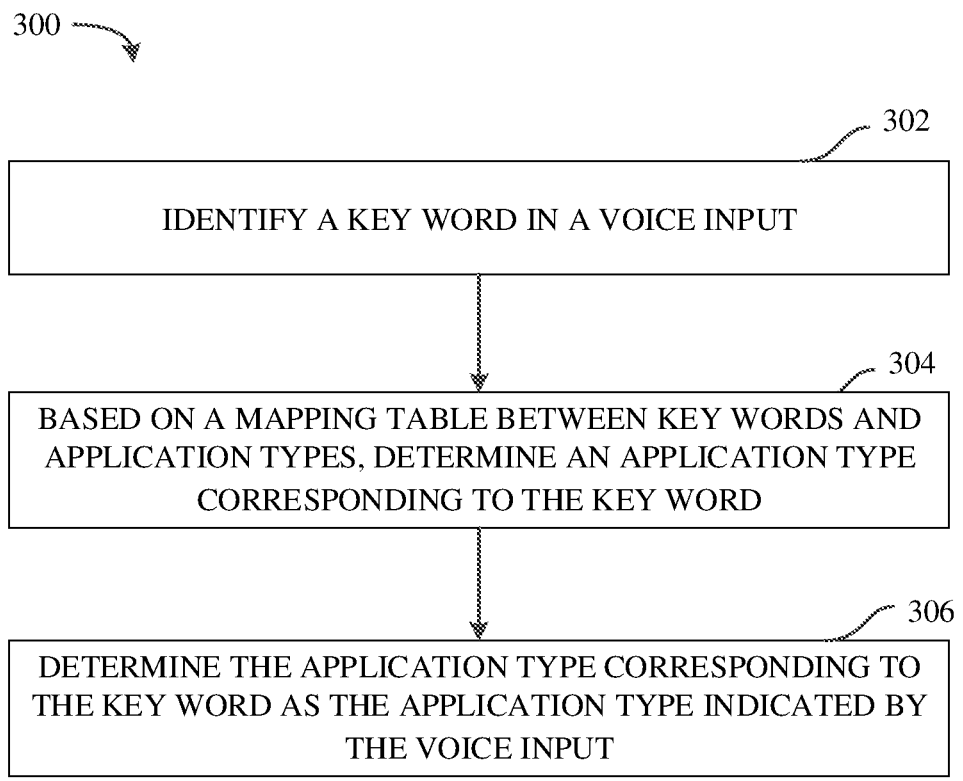
FIG. 3 is a schematic flow chart illustrating a method for determining an application type indicated by a voice input according to implementations of the disclosure.

FIG. 3 is a schematic flow chart illustrating a method 300 for determining an application type indicated by a voice input according to implementations of the disclosure. For example, the method 300 may be performed by the in-vehicle electronic device 110 as shown in FIG. 1. It should be appreciated that the method 300 may further include additional blocks not shown and/or may omit blocks shown, and the disclosure is not limited thereto.

At block 302, a key word in a voice input is identified.

For example, if the voice input is "listen to my music", the key word may be identified as "music". For another example, if the voice input is "watch my movies", the key word may be identified as "movie(s)". For another example, if the voice input is "use my map", the key word may be identified as "map". The key word in the voice input may be identified, for example, using any applicable voice recognition method.

At block 304, based on a mapping table between key words and application types, an application type corresponding to the key word is determined.

An example mapping table between key words and application types is illustrated as follows.

TABLE 1

Mapping table between key words and application types

| Key words | Application types |
|---|---|
| video, movie, animation | video application |
| song, tune, music | music application |
| map, navigation | navigation application |

For example, if the identified key word is "music", the application type corresponding to "music" can be found to be music application. If the identified key word is "movie", the application type corresponding to "movie" can be found to be video application. If the identified key word is "map", the application type corresponding to "map" can be found to be navigation application.

At block 306, the application type corresponding to the key word is determined as the application type indicated by the voice input.

As such, the application type indicated by the user can be determined based on the key word in the voice input. The key words are relevant to a user's common words, which improves user experience.

Figure 4:
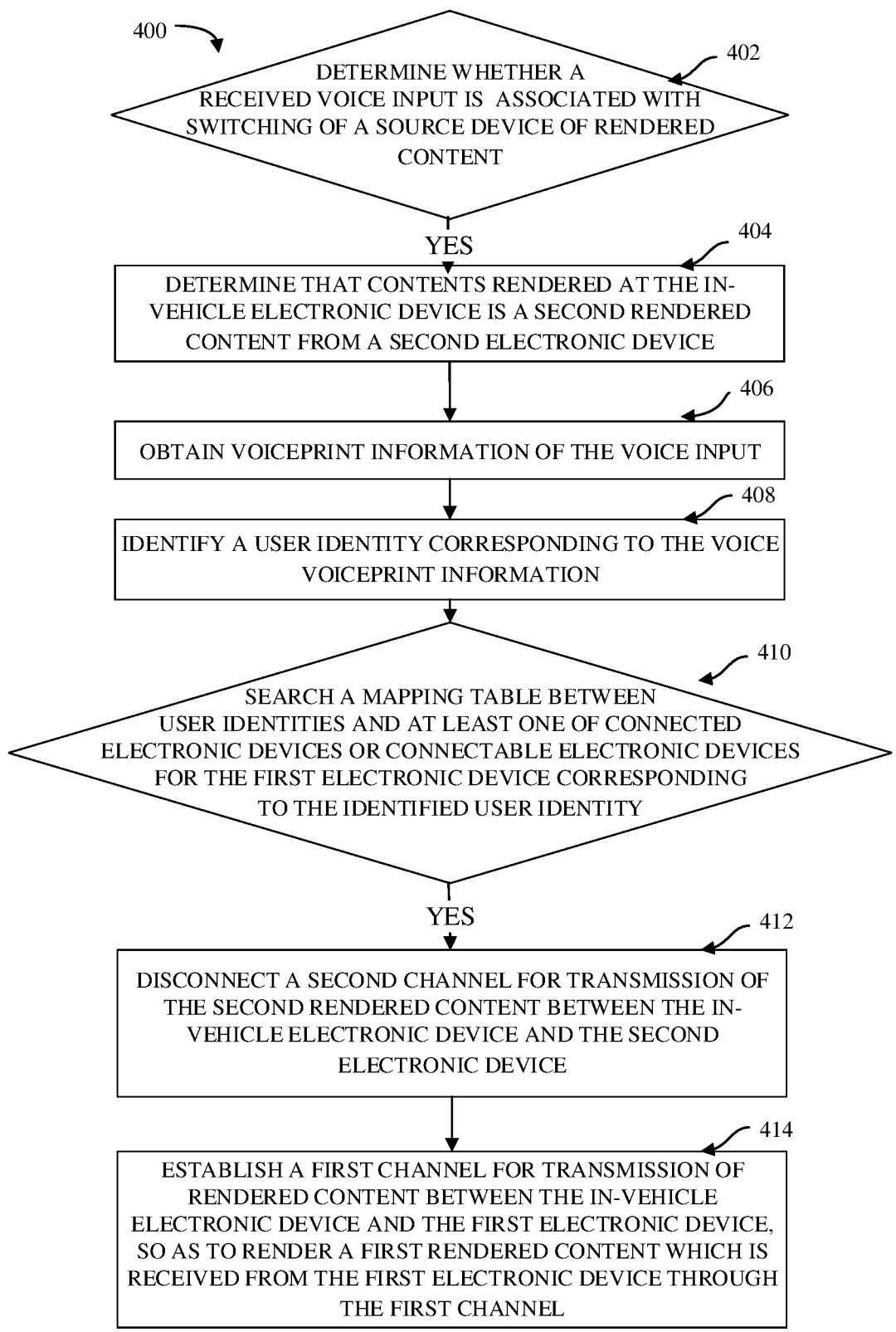
FIG. 4 is a schematic flow chart illustrating a method for information processing according to implementations of the disclosure.

FIG. 4 is a schematic flow chart illustrating a method 400 for information processing according to implementations of the disclosure. For example, the method 400 may be performed by the in-vehicle electronic device 110 as shown in FIG. 1. It should be appreciated that the method 400 may further include additional blocks not shown and/or may omit blocks shown, and the disclosure is not limited thereto.

At block 402, at the in-vehicle electronic device 110, whether a received voice input is associated with switching a source device for switching a rendered content shown at the in-vehicle electronic device is determined.

If the received voice input is determined to be associated with the switching of the source device of the rendered content at block 402, it indicates that contents rendered at the in-vehicle electronic device is a second presenting content from a second electronic device at block 404.

At block 406, voiceprint information of the voice input is obtained.

At block 408, a user identity corresponding to the voice voiceprint information is identified.

At block 410, a mapping table between user identities and connected electronic devices or connectable electronic devices is searched for the first electronic device 120 corresponding to the identified user identity.

If the first electronic device 120 corresponding to the user identity is found out at block 410, the source device is identified as the first electronic device, and a second channel for transmission of the second presenting content between the in-vehicle electronic device 110 and the second electronic device 130 is disconnected at block 412.

At block 414, a first channel for transmission of rendered content between the in-vehicle electronic device 110 and the first electronic device 120 is established, so as to render a first presenting content which is received from the first electronic device through the first channel.

In this way, rendered contents at the vehicle may be switched to rendered contents from the electronic device corresponding to the user based on the voice switching instruction and the voiceprint information of the user, which is convenient and efficient without complicated manual operations, improving user experience.

In some implementations, the method 400 may further include the following. In response to finding out the first electronic device 120 corresponding to the user identity, whether the second presenting content includes an audio content is determined. Based on a determination that the second presenting content includes the audio content, the second channel for transmission of the second presenting content between the in-vehicle electronic device 110 and the second electronic device 120 is disconnected.

For example, if the second presenting content from the second electronic device 120 includes the audio content such as music, the second channel between the in-vehicle electronic device 110 and the second electronic device 120 will be disconnected in spite of whether or not the first presenting content from the first electronic device 120 includes an audio content.

As such, the second channel for the second presenting content is disconnected only when the second presenting content, which is rendered before switching, includes the audio content. Considering that the audio content exclusively occupies the output channel during output, the second channel can be disconnected more precisely under specific conditions, which makes it possible to continuously display the second presenting content when the second presenting content includes no audio content, avoiding disconnecting the second channel for the second presenting content regardless of different situations.

Alternatively or additionally, in some implementations, the method 400 may further include the following. Based on a determination that the second presenting content includes an audio content, whether the application name or the application type indicated by the voice input relates to the audio content is determined. Based on a determination that the application name or the application type relates to the audio content, the second channel for transmission of the second presenting content between the in-vehicle electronic device 110 and the second electronic device 130 is disconnected.

For example, in a case that the second presenting content from the second electronic device includes an audio content, such as music, if the application name or application type indicated by the voice input, e.g., is "photo album", the second channel between the in-vehicle electronic device and the second electronic device may not be disconnected; if the application name or application type indicated by the voice input is "XX music", the second channel between the in-vehicle electronic device and the second electronic device may be disconnected.

As such, the second channel for the second presenting content is disconnected only when both the second presenting content and the application content to be rendered include audio contents. Considering that the audio content exclusively occupies the output channel during output, the second channel can be disconnected more precisely under specific conditions, which makes it possible to continuously display the second presenting content when the second presenting content includes no audio content or the application content to be rendered includes no audio content, avoiding disconnecting the second channel for the second presenting content regardless of different situations.

Alternatively or additionally, in some implementations, the method 400 may further include the following. Based on a determination that the second presenting content includes no audio content, whether the first presenting content includes a display content is determined. Based on a determination that the first presenting content includes the display content, the first presenting content and the second presenting content are rendered.

As such, in a case that the second presenting content before switching includes no audio content and the first presenting content to be switched includes the display content, the first presenting content and the second presenting content can be displayed at the same time without covering the second presenting content, which achieves simultaneous display of rendered contents from multiple electronic devices on the in-vehicle display.

Alternatively or additionally, in some implementations, the first presenting content and the second presenting content may be displayed as follows. A sound source direction of the voice input is determined. When the sound source direction is determined to be the left side of the vehicle, the first presenting content is rendered on the left side of the display area of the in-vehicle electronic device, and the second presenting content is rendered on the right side of the display area. When the sound source direction is determined to be the right side of the vehicle, the first presenting content is rendered on the right side of the display area of the in-vehicle electronic device, and the second presenting content is rendered on the left side of the display area.

For example, the sound source direction of the voice input may be determined using time difference of arrival (TDOA). A latency difference of arrivals from a sound source to different in-vehicle pick-ups may be estimated. A distance difference may be calculated based on the latency difference. The position of the sound source may be determined based on the distance difference and spatial geometrical positions of an array of in-vehicle pick-ups. As an example, the in-vehicle pick-up array may include pick-ups disposed in the B pillars on both sides of the vehicle. If a latency of arrivals at a pick-up in the B pillar on the left side is longer than a latency of arrivals at a pick-up in the B pillar on the right side, the sound source is determined to be on the left side of the vehicle; otherwise, the sound source is determined to be on the right side of the vehicle.

Figure 5:
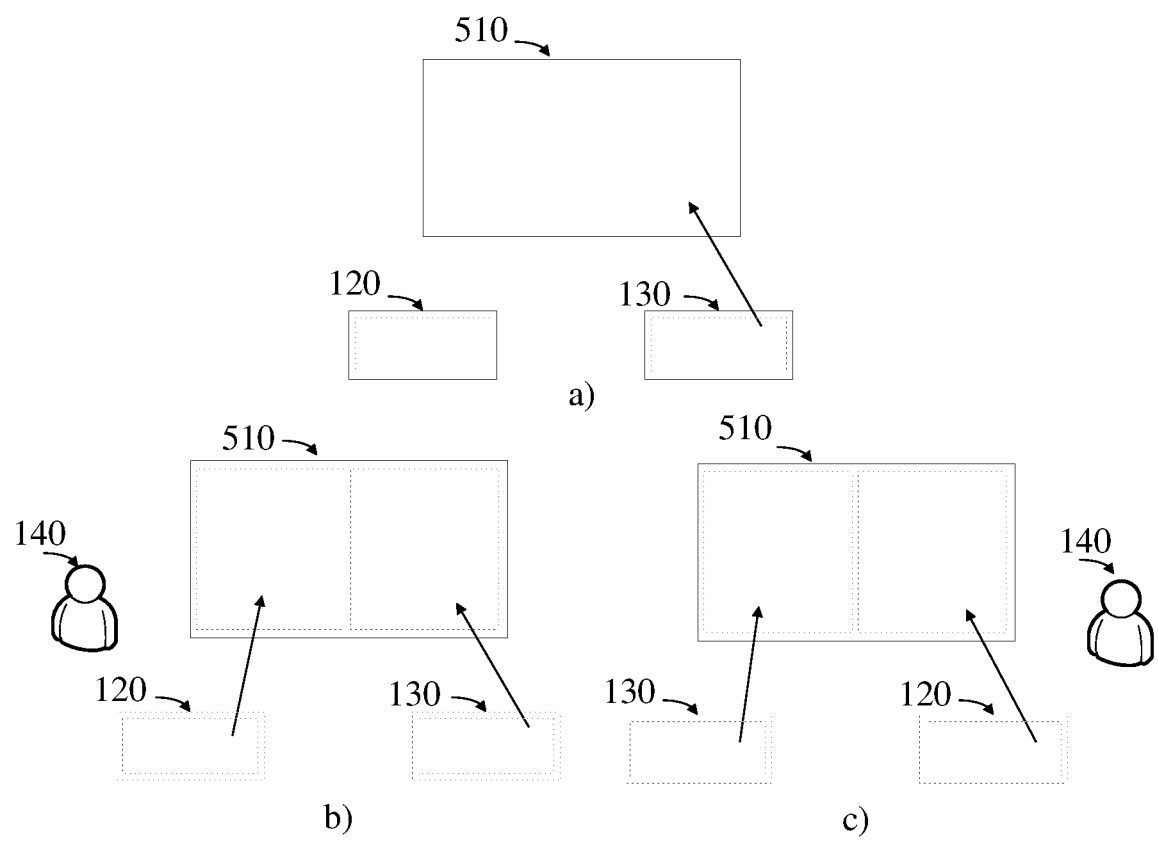
FIG. 5 is a schematic diagram illustrating a display mode according to implementations of the disclosure.

FIG. 5 is a schematic diagram illustrating a display mode according to implementations of the disclosure. As illustrated in FIG. 5, in a), a display area 510 is displaying the second presenting content from the second electronic device 130. As illustrated in FIG. 5, in b), a first user 140 inputs a voice which is associated with switching a source device for switching a rendered content shown at the in-vehicle electronic device, such as "use my phone", and the sound source direction is determined to be the left side of the vehicle. Therefore, the first presenting content from the first electronic device 120 is displayed on the left side of the display area 510, and the second presenting content from the second electronic device 130 is displayed on the right side of the displayed area 510. As illustrated in FIG. 5, in c), the sound source direction is determined to be the right side of the vehicle. Therefore, the first presenting content from the first electronic device 120 is displayed on the right side of the display area 510, and the second presenting content from the second electronic device 130 is displayed on the left side of the displayed area 510.

As such, the rendered content from the electronic device corresponding to the user can be displayed on the corresponding side of the sound source of the user's voice input, which is convenient for the user to watch, improving user experience.

Figure 6:
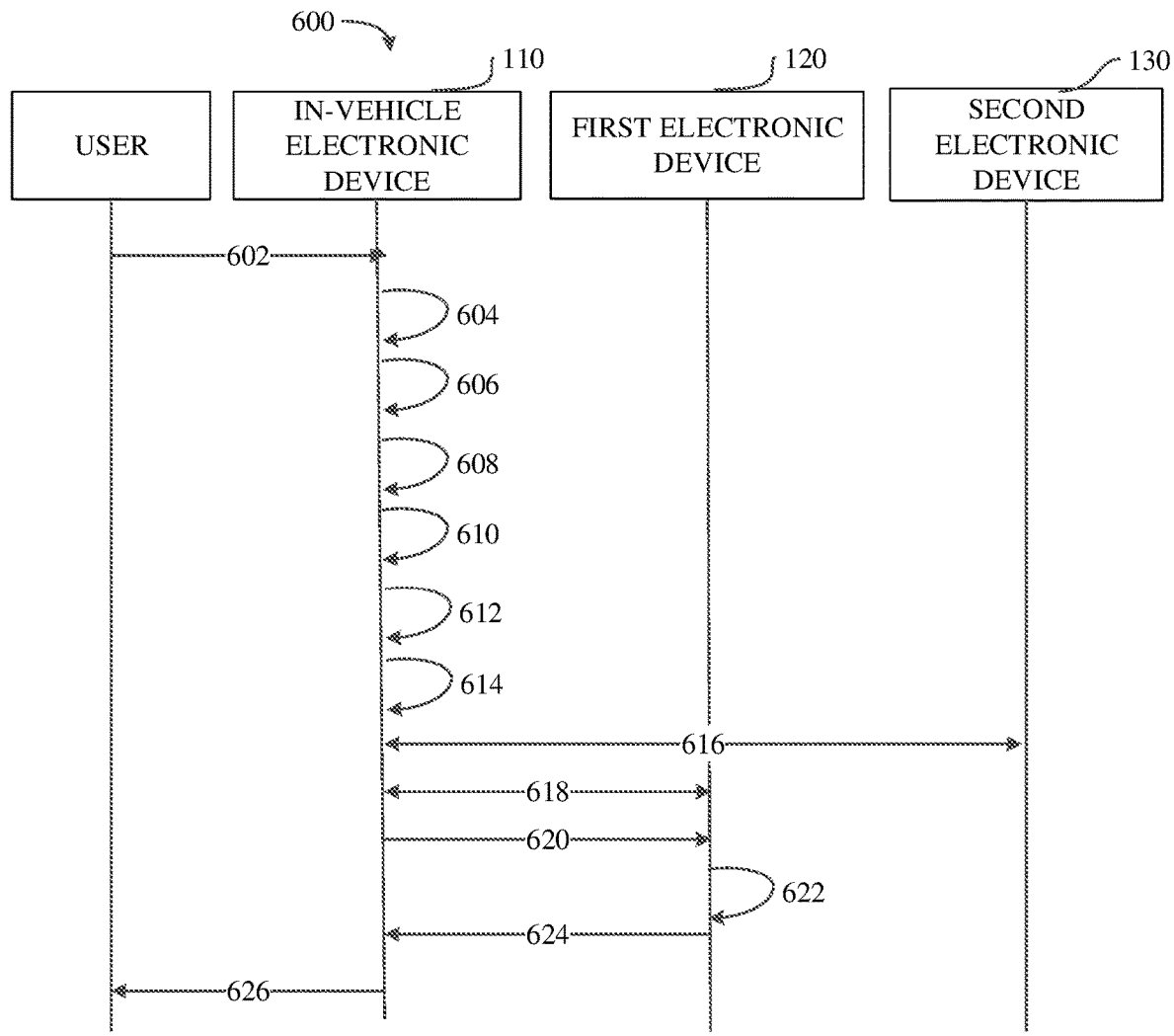
FIG. 6 is a schematic flow chart illustrating a method for information processing according to implementations of the disclosure.

FIG. 6 is a schematic flow chart illustrating a method 600 for information processing according to implementations of the disclosure. It should be appreciated that the method 600 may further include additional steps not shown and/or may omit steps shown, and the disclosure is not limited thereto.

At 602, the in-vehicle electronic device 110 receives a voice input.

At 604, the in-vehicle electronic device 110 determines that the received voice input is associated with switching a source device for switching a rendered content shown at the in-vehicle electronic device.

At 606, the in-vehicle electronic device 110 determines that contents rendered at the in-vehicle electronic device is a second presenting content from a second electronic device.

At 608, the in-vehicle electronic device 110 determines at least one of an application name or an application type indicated by the voice input.

At 610, the in-vehicle electronic device 110 obtains voiceprint information of the voice input.

At 612, the in-vehicle electronic device 110 identifies a user identity corresponding to the voiceprint information.

At 614, the in-vehicle electronic device 110 searches a mapping table between user identities and connected electronic devices or connectable electronic devices for the first electronic device 120 corresponding to the identified user identity.

At 616, the in-vehicle electronic device 110 disconnects a second channel for transmission of the second presenting content between the in-vehicle electronic device 110 and the second electronic device 130.

At 618, the in-vehicle electronic device 110 establishes a first channel for transmission of rendered content between the in-vehicle electronic device 110 and the first electronic device 120, so as to render a first presenting content which is received from the first electronic device through the first channel.

At 620, the in-vehicle electronic device 110 sends an instruction for rendering an application corresponding to the application name or the application type to the first electronic device 120.

At 622, the first electronic device 120 renders the application corresponding to the application name or the application type.

At 624, the first electronic device 120 transmits the first presenting content of the application to the in-vehicle electronic device 110 through the first channel.

At 626, the in-vehicle electronic device 110 renders the first presenting content.

Figure 7:
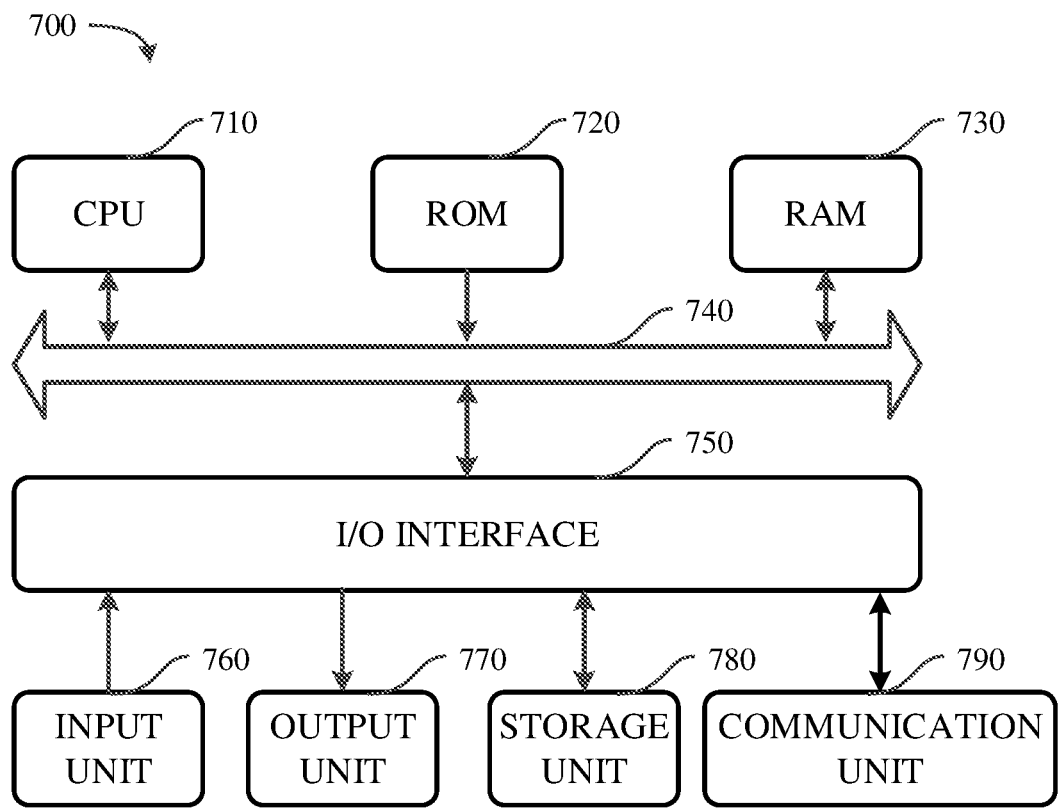
FIG. 7 is a schematic block diagram illustrating an example device which can be used to implement the disclosure.

FIG. 7 is a schematic block diagram illustrating an example device 700 which can be used to implement the disclosure. For example, the in-vehicle electronic device 110 shown in FIG. 1 may be implemented by the device 700. As shown in the figure, the device 700 includes a central processing unit (CPU) 710, which can perform various appropriate actions and processing according to computer program instructions which are stored in a read-only memory (ROM) 720 or loaded from a storage unit 780 to a random access memory (RAM) 730. In the RAM 730, various programs and data required for the operation of the device 700 can also be stored. The CPU 710, the ROM 720, and the RAM 730 are connected with each other through a bus 740. An input/output (I/O) interface 750 is also connected with the bus 740.

Multiple components in the device 700 are connected to the I/O interface 750, these components including: an input unit 760, such as a keyboard, a mouse, a microphone, etc.; an output unit 770, such as various types of displays, speakers, etc.; a storage unit 780, such as a magnetic disk, an optical disk, etc.; and a communication unit 790, such as a network card, a modem, a wireless communication transceiver, etc. The communication unit 790 allows the device 700 to exchange information/data with other devices through a computer network such as the Internet and/or various telecommunication networks.

The various procedures and processing described above, such as the methods 200-600, may be executed by the CPU 710. For example, in some implementations, the methods 200-600 may be implemented as computer software programs, which are tangibly contained in a machine-readable medium, such as the storage unit 780. In some implementations, part or all of the computer programs may be loaded and/or installed on the device 700 via the ROM 720 and/or the communication unit 790. When the computer programs are loaded into the RAM 730 and executed by the CPU 710, one or more actions of the methods 200-600 described above may be executed.

The present disclosure may be a method, device, system, and/or computer program product. The computer program product may include a computer-readable storage medium storing computer-readable program instructions for executing various aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create module for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method comprising:
   obtaining, at an in-vehicle electronic device, voiceprint information of a received voice input in response to a determination that the received voice input is associated with switching of a source device of a rendered content shown at the in-vehicle electronic device;
   identifying a user identity corresponding to the voiceprint information;
   searching a mapping table between user identities and connected electronic devices or connectable electronic devices for a first electronic device corresponding to the identified user identity; and
   establishing a first channel for transmission of a first presenting content between the in-vehicle electronic device and the first electronic device, in response to searching out the first electronic device which is the source device, so as to render the first presenting content which is received from the first electronic device through the first channel; and
   wherein the rendered content shown at the in-vehicle electronic device is a second presenting content from a second electronic device; and
   wherein the method further comprises:
   disconnecting a second channel for transmission of the second presenting content between the in-vehicle electronic device and the second electronic device at least partially in response to finding out the first electronic device corresponding to the user identity.

2. The method of claim 1, further comprising:
   determining at least one of an application name or an application type indicated by the voice input; and
   sending, to the first electronic device, an instruction for rendering an application corresponding to the application name or the application type, such that the first presenting content comprises the application.

3. The method of claim 2, wherein determining the application type indicated by the voice input comprises:
   identifying a key word in the voice input;
   determining an application type corresponding to the key word based on a mapping table between key words and application types; and
   determining the application type corresponding to the key word as the application type indicated by the voice input.

4. The method of claim 1, further comprising:
 determining whether the second presenting content comprises an audio content in response to finding out the first electronic device corresponding to the user identity; and
 disconnecting the second channel for transmission of the second presenting content between the in-vehicle electronic device and the second electronic device based on a determination that the second presenting content comprises the audio content.

5. The method of claim 4, further comprising:
 determining whether the first presenting content comprises a display content in response to a determination that the second presenting content comprises no audio content; and
 rendering the first presenting content and the second presenting content based on a determination that the first presenting content comprises the display content.

6. The method of claim 5, wherein rendering the first presenting content and the second presenting content comprises:
 determining a sound source direction of the voice input;
 rendering the first presenting content on the left side of a display area of the in-vehicle electronic device and rendering the second presenting content on the right side of the display area based on a determination that the sound source direction is the left side of a vehicle; and
 rendering the first presenting content on the right side of the display area and rendering the second presenting content on the left side of the display area based on a determination that the sound source direction is the right side of the vehicle.

7. A device, comprising:
 at least one processor; and
 at least one non-transitory memory coupled with the at least one processor and storing instructions configured to be executed by the at least one processor, wherein when executed by the at least one processor, the instructions cause the device to:
  obtain voiceprint information of a received voice input in response to a determination that the received voice input is associated with switching of a source device of a rendered content shown at the device;
  identify a user identity corresponding to the voiceprint information;
  search a mapping table between user identities and connected electronic devices or connectable electronic devices for a first electronic device corresponding to the identified user identity; and
  establish a first channel for transmission of a first presenting content between the device and the first electronic device, in response to searching out the first electronic device which is the source device, so as to render the first presenting content that is received from the first electronic device through the first channel; and
  wherein the rendered content shown at the device is a second presenting content from a second electronic device; and
  wherein the instructions further cause the device to:
   disconnect a second channel for transmission of the second presenting content between the device and the second electronic device at least partially in response to finding out the first electronic device corresponding to the user identity.

8. The device of claim 7, wherein the instructions further cause the device to:
 determine at least one of an application name or an application type indicated by the voice input; and
 send, to the first electronic device, an instruction for rendering an application corresponding to the application name or the application type, such that the first presenting content comprises the application.

9. The device of claim 8, wherein the instructions causing the device to determine the application type indicated by the voice input further cause the device to:
 identify a key word in the voice input;
 determine an application type corresponding to the key word based on a mapping table between key words and application types; and
 determine the application type corresponding to the key word as the application type indicated by the voice input.

10. The device of claim 7, wherein the instructions further cause the device to:
 determine whether the second presenting content comprises an audio content in response to finding out the first electronic device corresponding to the user identity; and
 disconnect the second channel for transmission of the second presenting content between the device and the second electronic device based on a determination that the second presenting content comprises the audio content.

11. The device of claim 10, wherein the instructions further cause the device to:
 determine whether the first presenting content comprises a display content based on a determination that the second presenting content comprises no audio content; and
 render the first presenting content and the second presenting content based on a determination that the first presenting content comprises the display content.

12. The device of claim 11, wherein the instructions causing the device to render the first presenting content and the second presenting content further cause the device to:
 determine a sound source direction of the voice input;
 render the first presenting content on the left side of a display area of the device and rendering the second presenting content on the right side of the display area based on a determination that the sound source direction is the left side of a vehicle; and
 render the first presenting content on the right side of the display area and rendering the second presenting content on the left side of the display area based on a determination that the sound source direction is the right side of the vehicle.

13. A non-transitory computer-readable storage medium storing a computer program thereon, wherein when executed by a machine, the computer program causes the machine to:
 obtain voiceprint information of a received voice input in response to a determination that the received voice input is associated with switching of a source device of a rendered content shown at an in-vehicle electronic device;
 identify a user identity corresponding to the voiceprint information;
 search a mapping table between user identities and connected electronic devices or connectable electronic devices for a first electronic device corresponding to the identified user identity; and establish a first channel for transmission of a first presenting content between the in-vehicle electronic device and the first electronic device, in response to searching out the first electronic device which is the source device, so as to render the first presenting content which is received from the first electronic device through the first channel; and wherein the rendered content shown at the in-vehicle electronic device is a second presenting content from a second electronic device; and wherein the computer program further causes the machine to:

disconnect a second channel for transmission of the second presenting content between the in-vehicle electronic device and the second electronic device at least partially in response to finding out the first electronic device corresponding to the user identity.

14. The non-transitory computer-readable storage medium of claim 13, wherein the computer program further causes the machine to:

determine at least one of an application name or an application type indicated by the voice input; and send, to the first electronic device, an instruction for rendering an application corresponding to the application name or the application type, such that the first presenting content comprises the application.

15. The non-transitory computer-readable storage medium of claim 14, wherein the computer program causing the machine to determine the application type indicated by the voice input causes the machine to:

identify a key word in the voice input;

determine an application type corresponding to the key word based on a mapping table between key words and application types; and determine the application type corresponding to the key word as the application type indicated by the voice input.

16. The non-transitory computer-readable storage medium of claim 13, wherein the computer program further causes the machine to:

determine whether the second presenting content comprises an audio content in response to finding out the first electronic device corresponding to the user identity; and disconnect the second channel for transmission of the second presenting content between the in-vehicle electronic device and the second electronic device based on a determination that the second presenting content comprises the audio content.

17. The non-transitory computer-readable storage medium of claim 16, wherein the computer program further causes the machine to:

determine whether the first presenting content comprises a display content in response to a determination that the second presenting content comprises no audio content; and render the first presenting content and the second presenting content based on a determination that the first presenting content comprises the display content.

* * * * *